United States Patent [19]

Maxey

[11] Patent Number: 5,581,757
[45] Date of Patent: Dec. 3, 1996

[54] PARTIALLY REPLICATED DATABASE FOR A NETWORK OF STORE-AND-FORWARD MESSAGE SYSTEMS

[75] Inventor: Gary Maxey, Los Altos, Calif.

[73] Assignee: Rolm Systems, Santa Clara, Calif.

[21] Appl. No.: 426,431

[22] Filed: Apr. 20, 1995

Related U.S. Application Data

[63] Continuation of Ser. No. 614,792, Nov. 15, 1990, abandoned.

[51] Int. Cl.$^6$ .................................................. G06F 17/30
[52] U.S. Cl. .................. 395/610; 395/200.01; 379/88; 358/402; 358/407; 364/282.1; 364/282.3; 364/222.3; 364/974.7; 364/974; 364/DIG. 1; 364/DIG. 2
[58] Field of Search .................................... 395/600, 200; 379/88; 358/402, 407

[56] References Cited

U.S. PATENT DOCUMENTS

| | | | |
|---|---|---|---|
| 4,186,438 | 1/1980 | Benson et al. | 395/600 |
| 4,414,644 | 11/1983 | Tayler | 345/425 |
| 4,630,196 | 12/1986 | Bednar, Jr. et al. | 395/200 |
| 4,672,660 | 6/1987 | Curtin | 379/88 |
| 4,782,509 | 11/1988 | Shepard | 379/88 |
| 4,790,003 | 12/1988 | Kepley et al. | 379/88 |
| 4,834,483 | 5/1989 | Arthurs et al. | 385/46 |
| 4,930,152 | 5/1990 | Miller | 379/214 |
| 4,935,956 | 6/1990 | Hellwarth et al. | 379/112 |
| 4,941,084 | 7/1990 | Terada et al. | 395/650 |
| 5,027,387 | 1/1991 | Moll | 379/112 |
| 5,200,994 | 4/1993 | Sasamo et al. | 379/142 |
| 5,287,498 | 2/1994 | Perelman et al. | 395/600 |

OTHER PUBLICATIONS

Davis Ralph, "Developing for Netware", *PC Tech Journal*, vol. 6, No. 8, Aug. 1988, pp. 108–122.
Stumm et al. "Algorithm & Implementing Distributed Shared Memory" *Computer*, May 1990, pp. 54–64.
Bennett et al. "Adaptive Software Cache Management for Distributed Shared Memory Architecture", CH2887-8/90/0000/0125.
Nitzberg et al. "Distributed Shared Memory: A Survey of Issues and Algorithms" *Computer*, vol. 24 No. 8, Aug. 1991 pp. 52–60.

*Primary Examiner*—Thomas G. Black
*Assistant Examiner*—Paul R. Lintz

[57] ABSTRACT

Method for generating and maintaining a user name database in a network of store-and-forward message system nodes, wherein databases associated with the individual nodes of the network are not completely replicated. In accordance with the present invention, whenever a sender addresses a message recipient whose name is not stored in a database associated with the message sender's system node, the message sender's system obtains the message recipient's name from a database associated with the message recipient's system node and the message sender's system node updates its associated database with the message recipient's name.

10 Claims, 14 Drawing Sheets

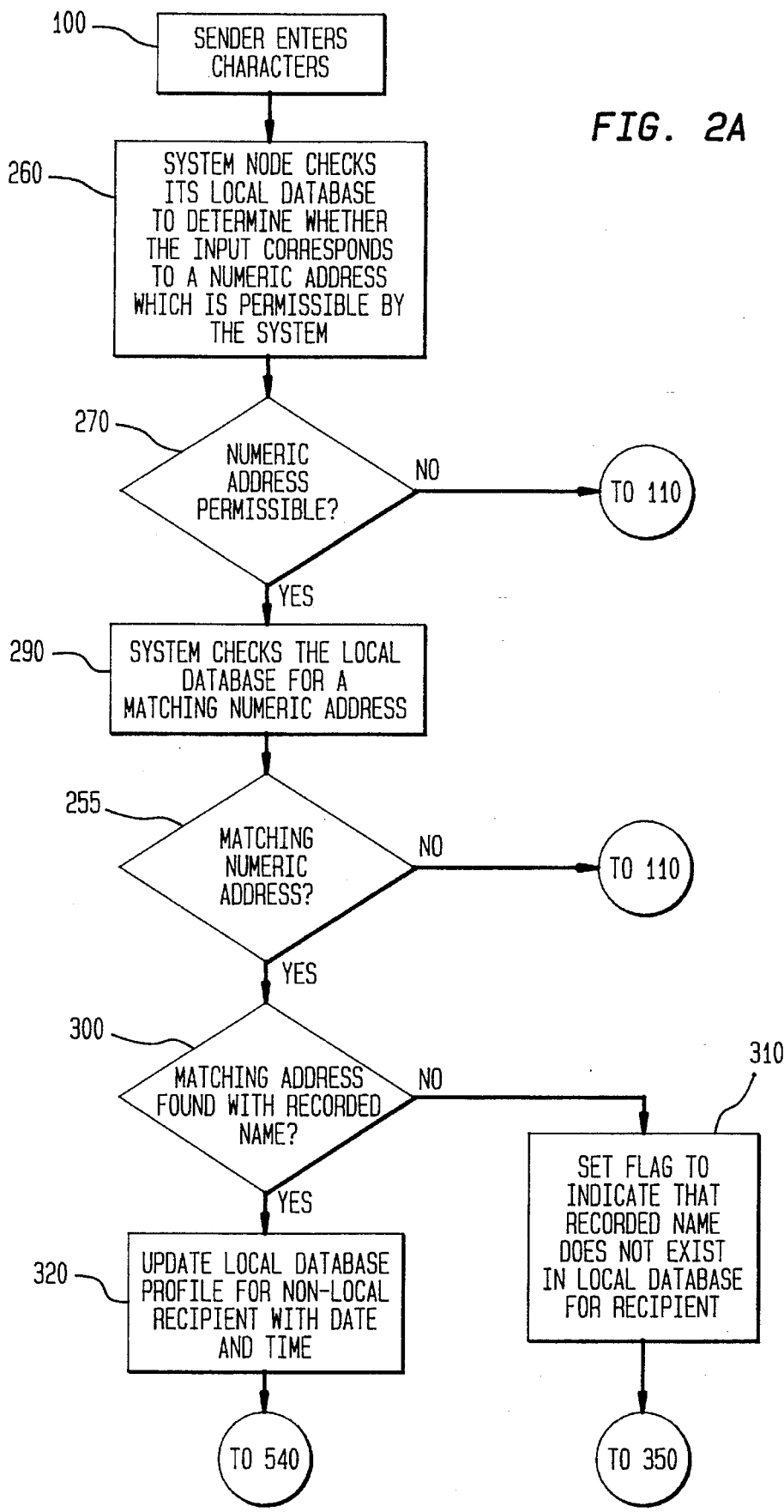

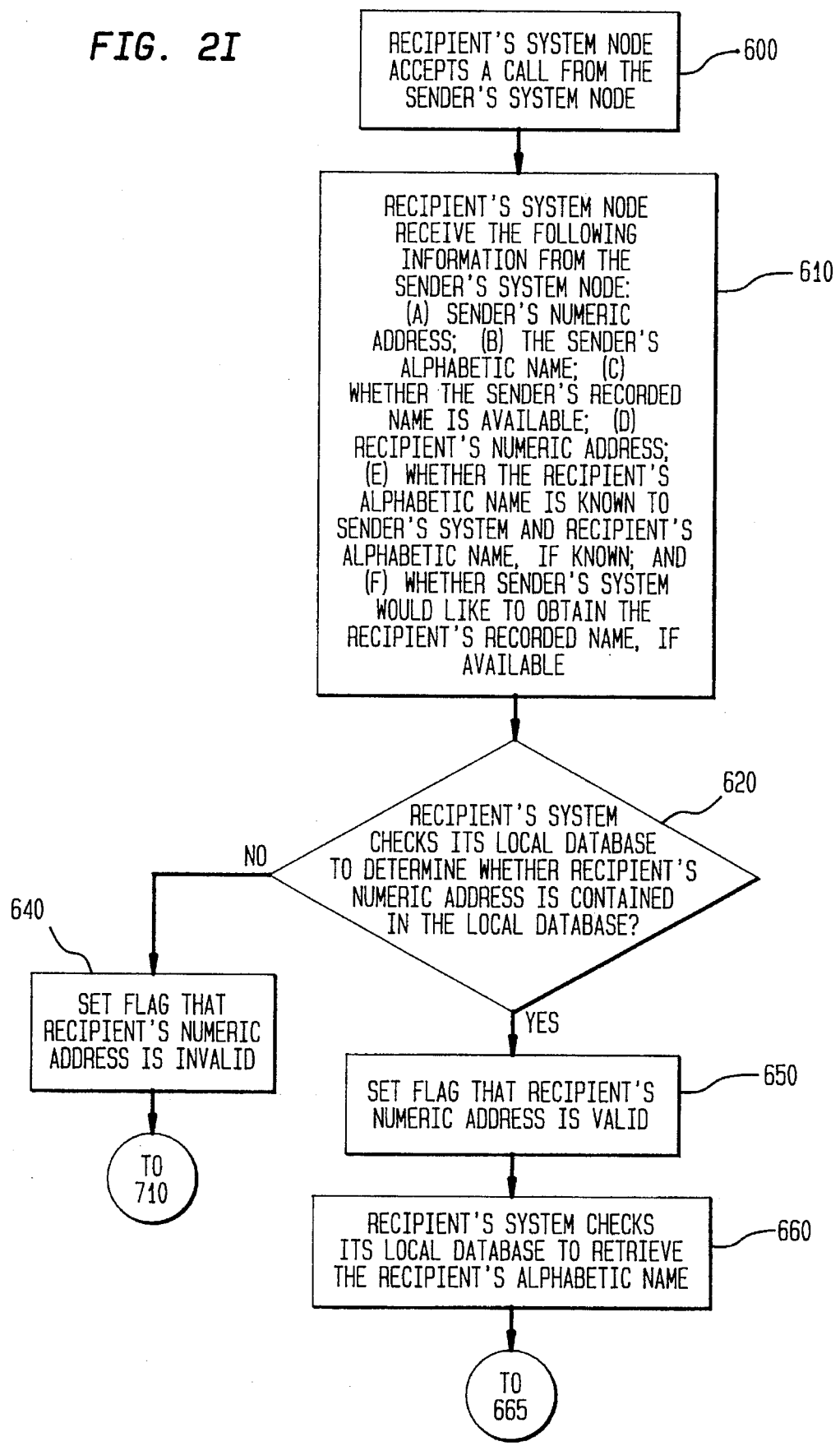

PARTIALLY REPLICATED DATABASE FOR A NETWORK OF STORE-AND-FORWARD MESSAGE SYSTEMS

CROSS-REFERENCE TO RELATED APPLICATION

This is a continuation of Ser. No. 07/614,792 filed Nov. 15, 1990 now abandoned.

TECHNICAL FIELD OF THE INVENTION

The present invention pertains to a method for generating and maintaining a user name database for use in a network of store-and-forward message system nodes.

BACKGROUND OF THE INVENTION

At present, a typical voice store-and-forward message system which is devoted to a single location provides a capability wherein message-sending users or senders can utilize a message recipient's name to address a message rather than using the message recipient's telephone number. This, as is well known in the art, is advantageous because senders generally find it easier to remember a message recipient's name rather than his or her telephone number. Further, some such voice store-and-forward message systems provide name confirmation wherein the system "speaks" the message recipient's name. In such systems, the sender enters a message recipient's name by using the digits provided by the keys of a typical telephone keypad having ten numeric keys, each key typically being representative of a multiplicity of alphabetic letters. The store-and-forward message system matches the digits entered from the telephone set against a numeric transcription of alphabetic names which are stored in its database. Once a unique match is found, the name has been recognized. If, however, there is no unique match, the sender is given a choice of potential matches from among a list of spoken names.

Although the above-described capability is desired, it may be costly to implement in a geographically dispersed network comprising a multiplicity of nodes if all the names in all of the nodes are stored in a database for each of the nodes. The cost involved includes the cost of generating a potentially large database, the cost of providing such a large database, and the cost of maintaining such a large database. These costs are not any less when most of the names stored at a node are not used. The cost of generating a large, multi-node database, above and beyond the cost of generating the local database at each node, comprises both the communications cost in transferring data among nodes and the cost at each node of checking for and resolving conflicts, both between remote data and local data and among remote data from different nodes. The cost of providing such a large database includes the obvious costs of primary storage media, of backup storage media, and of copying from primary to backup storage media, as well as the less obvious effect of a loss of efficiency in addressing by name. The loss of efficiency is due to the presence of many names in the database which could cause matches, even for local users at a node who do not intend to use the network. The cost of maintaining such a large network database includes both the communication costs for updates to all nodes when any node has a database change and the exponentially increased costs of consistency checking as the size of the database increases.

In light of the above, there is a need in the art for a method for generating and maintaining a user name database in a network of store-and-forward message system nodes, wherein the database associated with each of the individual nodes of the network is not completely replicated.

SUMMARY OF THE INVENTION

Embodiments of the present invention advantageously satisfy the above-identified need in the art and provide a method for generating and maintaining a user name database in a network of store-and-forward message system nodes, wherein the database associated with each of the individual nodes of the network is not completely replicated. Embodiments of the present invention advantageously provide a database at a store-and-forward message system node which is comprised of local users of the store-and-forward message system node and some users of other store-and-forward message system nodes in the network. In accordance with the present invention, whenever a sender addresses a message recipient whose name is not stored in the sender's local database, the sender must use the numeric address of the message recipient. Then, the message sender's local system obtains the message recipient's name from the message recipient's local store-and-forward message system node. Finally, the message sender's system node updates its local database with the message recipient's name. Similarly, whenever a message sender's name is not stored in a message recipient's local database, the message recipient's system node updates its local database with the message sender's name. In preferred embodiments of the present invention, the network portion, i.e., non-local portion, of the local databases are monitored. Then, if a particular name entry in the network portion is not used for a locally predetermined and selectable period of time, a database utility program can delete it automatically or a database administrator can delete it manually. As a result, and in accordance with the present invention, each local store-and-forward message system node has a database which comprises local user names and names of users of remote system nodes who receive or send messages actively. Note that a name may be comprised of an alphabetic name as well as an optional, recorded, spoken name. In preferred embodiments of the present invention, each node of the network can specify whether or not to send or receive spoken names, and a spoken name is sent from one node to another node if: (a) it is available at one node which is willing to send it; (b) it is not available at the other node which is willing to receive it; and (c) a message is being sent to or from the person whose name it is.

BRIEF DESCRIPTION OF THE DRAWING

A complete understanding of the present invention may be gained by considering the following detailed description in conjunction with the accompanying drawing, in which:

FIGS. 2A–2G and 2I–2N comprise a flowchart of software which is used to fabricate a preferred embodiment of the present invention for generating and maintaining a user name database in a network of store-and-forward message system nodes.

DETAILED DESCRIPTION

Figure 1:
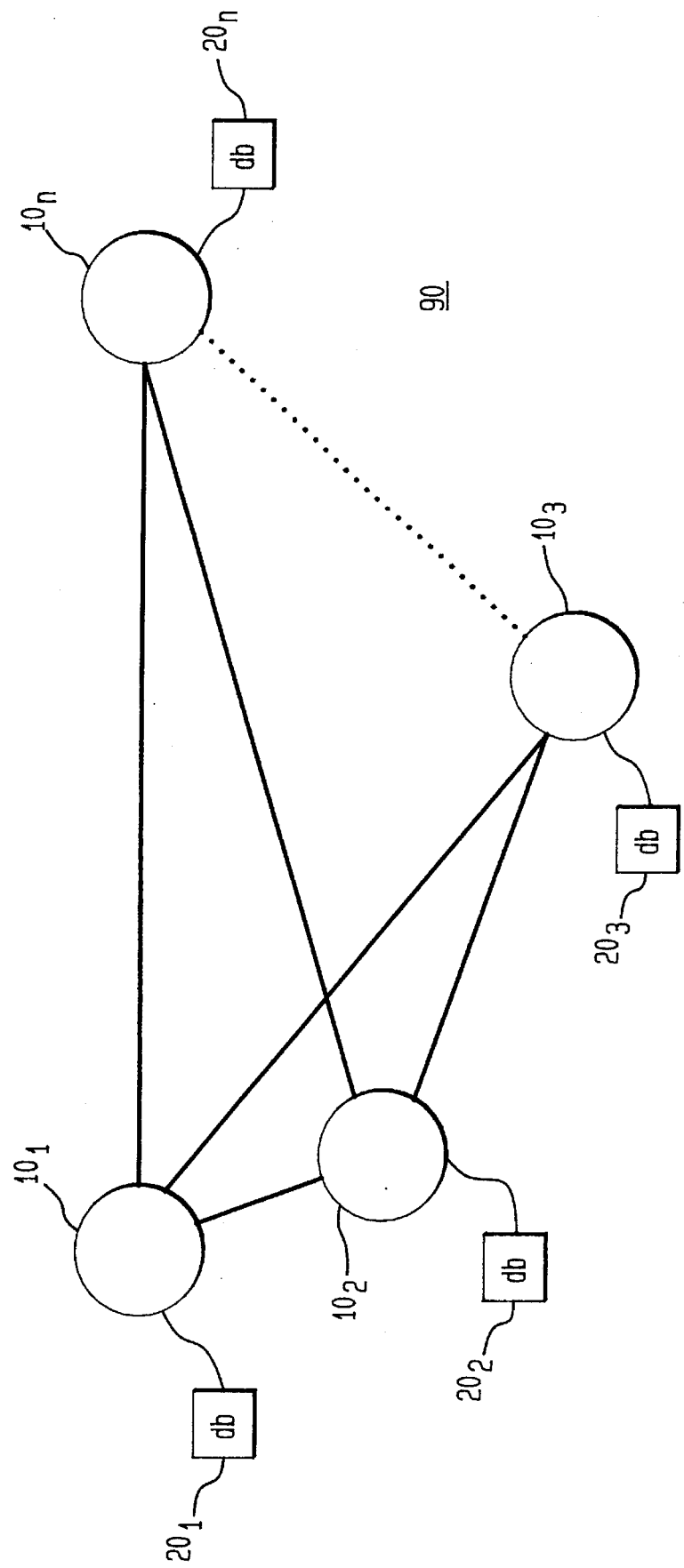
FIG. 1 is an block diagram of an embodiment of the present invention.

Before describing the operation of preferred embodiment 90 of the present invention shown in FIG. 1 in detail with reference to FIGS. 2A–2G and 2I–2N, we will describe how preferred embodiment 90 operates in general.

As shown in FIG. 1, embodiment 90 of the present invention is comprised of store-and-forward message system nodes $10_1$ to $10_n$. Each of store-and-forward message system nodes $10_1$ to $10_n$ interacts with local users and is comprised of a local database $20_1$ to $20_n$, respectively. Further, as is shown in FIG. 1, each of store-and-forward message system nodes $10_1$ to $10_n$ has a communications connection with predetermined ones of the other store-and-forward message system nodes in network 90. Of course, those of ordinary skill in the art clearly appreciate that the present invention in not restricted to such an embodiment and also covers an embodiment wherein private branch exchanges are utilized so that any node may contact any other node via, for example, the public telephone network.

In accordance with the present invention, whenever a sender at a first store-and-forward message system node addresses a message recipient by name and the message recipient's name is not stored in the local database, the local store-and-forward message system node requires the sender to address the message recipient by numeric address. Then, the local store-and-forward message system node transmits the message, for example, a voice message, to the local store-and-forward message system node of the message recipient along with the message sender's alphabetic name and a flag which indicates that the message recipient's name is unknown to the sending system node. In response, the receiving system node sends a communication to the sending system node to: (a) request a spoken record of the message sender's name if the receiving system node does not have the message sender's name in its local database and (b) transmit the message recipient's alphabetic and spoken name. Finally, both the sending and receiving system nodes, as necessary, update their local databases with the sender's and the recipient's alphabetic and spoken names, respectively. As a result of this, as one can readily appreciate, both the sending and receiving system nodes now know the sender and recipient names and name entry and name confirmation can be used the next time a message is addressed to the same recipient and name entry and name confirmation for the message sender can also be used by users of the original message recipient's system node.

Where the message sender's system node has the alphabetic name of the message recipient in its local database, the message sender may address a message recipient by either name or telephone number. Then, when the local store-and-forward message system transmits the message to the local store-and-forward message system node of the message recipient, both the message recipient's alphabetic name and telephone number are transmitted to the message recipient's system node. In response, the message recipient's system node verifies the message recipient's alphabetic name and telephone number and the message may not be accepted unless both match. This provides a measure of security in case the recipient is a person with the same name as a user who has previously left the system.

In addition, usage dates for network, i.e., non-local, user names are maintained by each local database. Thus, whenever a message is received by a message recipient's system node from a non-local user, a profile for the non-local user which is maintained at the local database for the message recipient's system node is updated with the current date. Further in addition, whenever a message is sent by a message sender's system node to a non-local message recipient, the message recipient's profile at the message sender's system node for non-local recipients is updated with the current date. As a result of this, the store-and-forward message system nodes provide reports to permit a network or local system administrator to monitor non-local system usage and, if desired, to delete names that have not been used for some time from local databases.

In a further embodiment of the present invention, a local database for a predetermined system node can be primed with predetermined network names. This priming of the database can be done in accordance with at least the following two methods. First, an alphabetic name is entered manually by a local system administrator and the spoken name is manually recorded by the local system administrator. Second, a utility program provides a capability wherein a local system administrator for one system node can send selected names, alphabetic and optionally spoken, to remote system nodes. It is also possible to combine these methods to permit the utility to propagate alphabetic names automatically and to permit the local system administrator to record the corresponding spoken names manually. Although this latter method might save on communications costs it might burden system administrators. However, as one can readily appreciate, use of any of the the above-described methods permits one to address by name even the first message to a non-local message recipient.

We now turn to describe the manner in which an embodiment of the present invention operates in detail with reference to the flowcharts shown in FIGS. 2A–2G and 2I–2N.

FIGS. 2A–2G and 2I–2N show a flowchart for system operation wherein a sender addresses a network or non-local message recipient by name or number. In particular, FIGS. 2A–2G show the interaction as it is handled at the sender's system node and FIGS. 2I–2N show the interaction as it is handled at the message recipient's system node.

The manner by which the keys of a telephone may be used to interact with a system by means of a sender-system interface to determine which keys have been pressed is well known in the art and will be omitted herein in order to make it easier to understand the present invention. In addition, as is well known to those of ordinary skill in the art, a telephone may include function keys which can be pressed to inform the system that the sender seeks to address a message by name or by numeric address. Further in addition, as is well known to those of ordinary skill in the art, a sender may also inform the system that he or she seeks to address a message by name or by numeric address by pressing predetermined sequences of keys in response to voice-generated commands which are transmitted from the system to the sender. Notwithstanding this, in the embodiment that is described below, the system is not informed as to whether the input corresponds to an alphabetic name or a numeric address prior to receiving the input. In particular, the system receives the input and compares it with alphabetical names and numeric addresses which are stored in the local database until there is a match or no possibility of a match. For example, if the system decides that the input corresponds to an alphabetical name, it will provide its decision and ask for confirmation from the sender.

We now describe the operation of the sender's system node in conjunction with FIGS. 2A–2G.

At box 100 of FIG. 2A, the sender enters a series of characters which are received by the sender-system interface. Then, control is transferred to box 260 of FIG. 2A to determine whether the input corresponds to a numeric address.

At box 260 of FIG. 2A, the sender's system node checks its local database to determine whether the input, considered as a numeric address, is one which is permitted by the system. Numeric addresses are typically constrained to fall within predetermined extension ranges and if the input, considered as a numeric address, is not within one of the predetermined extension ranges it is deemed to be impermissible. Then, control is transferred to decision box 270 of FIG. 2A.

At decision box 270 of FIG. 2A, the sender's system node determines whether the input, considered as a numeric address, is permissible. If so, control is transferred to box 290 of FIG. 2A, otherwise, control is transferred to box 110 of FIG. 2C.

At box 290 of FIG. 2A, the sender's system node checks the local database for a matching numeric address. Then, control is transferred to decision box 295 of FIG. 2A.

At decision box 295 of FIG. 2A, the sender's system node determines whether a matching numeric address is found. If so, control is transferred to decision box 300 of FIG. 2A, otherwise, control is transferred to box 110 of FIG. 2C.

At decision box 300 of FIG. 2A, the sender's system node determines whether the matching numeric address is found with a recorded name. If so, control is transferred to box 320 of FIG. 2A, otherwise, control is transferred to box 310 of FIG. 2A.

Figure 2B:
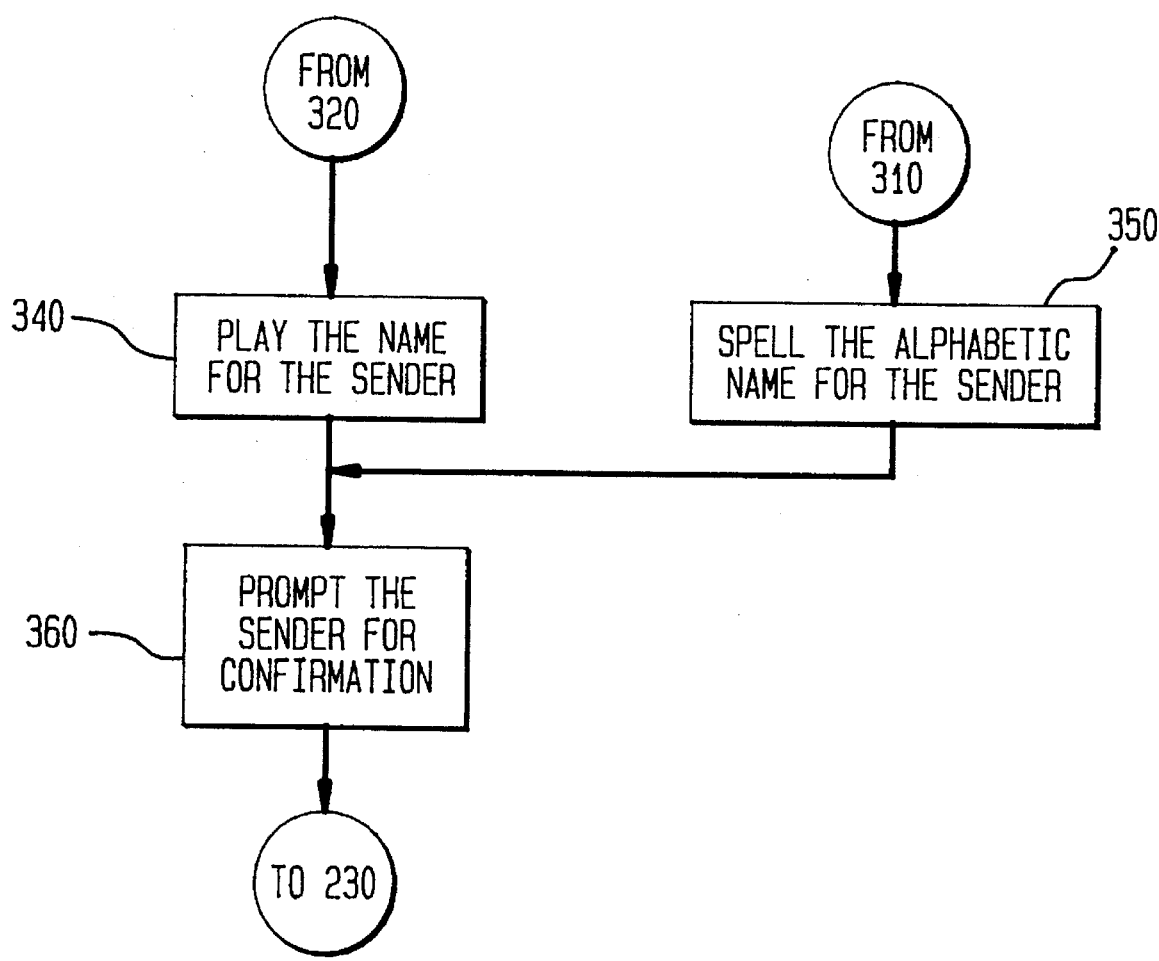

At box 310 of FIG. 2A, the sender's system node sets a flag to indicate that the recorded name of the recipient does not exist in the local database for the sender's system node. Then, control is transferred to box 350 of FIG. 2B.

At box 320 of FIG. 2A, the sender's system node updates its local database for the non-local recipient to add the present date and time to the non-local user profile. Then, control is transferred to box 340 of FIG. 2B.

At box 340 of FIG. 2B, the sender's system node plays the recipient's recorded name for the sender and control is transferred to box 360 of FIG. 2B.

At box 350 of FIG. 2B, the sender's system node spells the recipient's alphabetic name for the sender and control is transferred to box 360 of FIG. 2B.

Figure 2C:
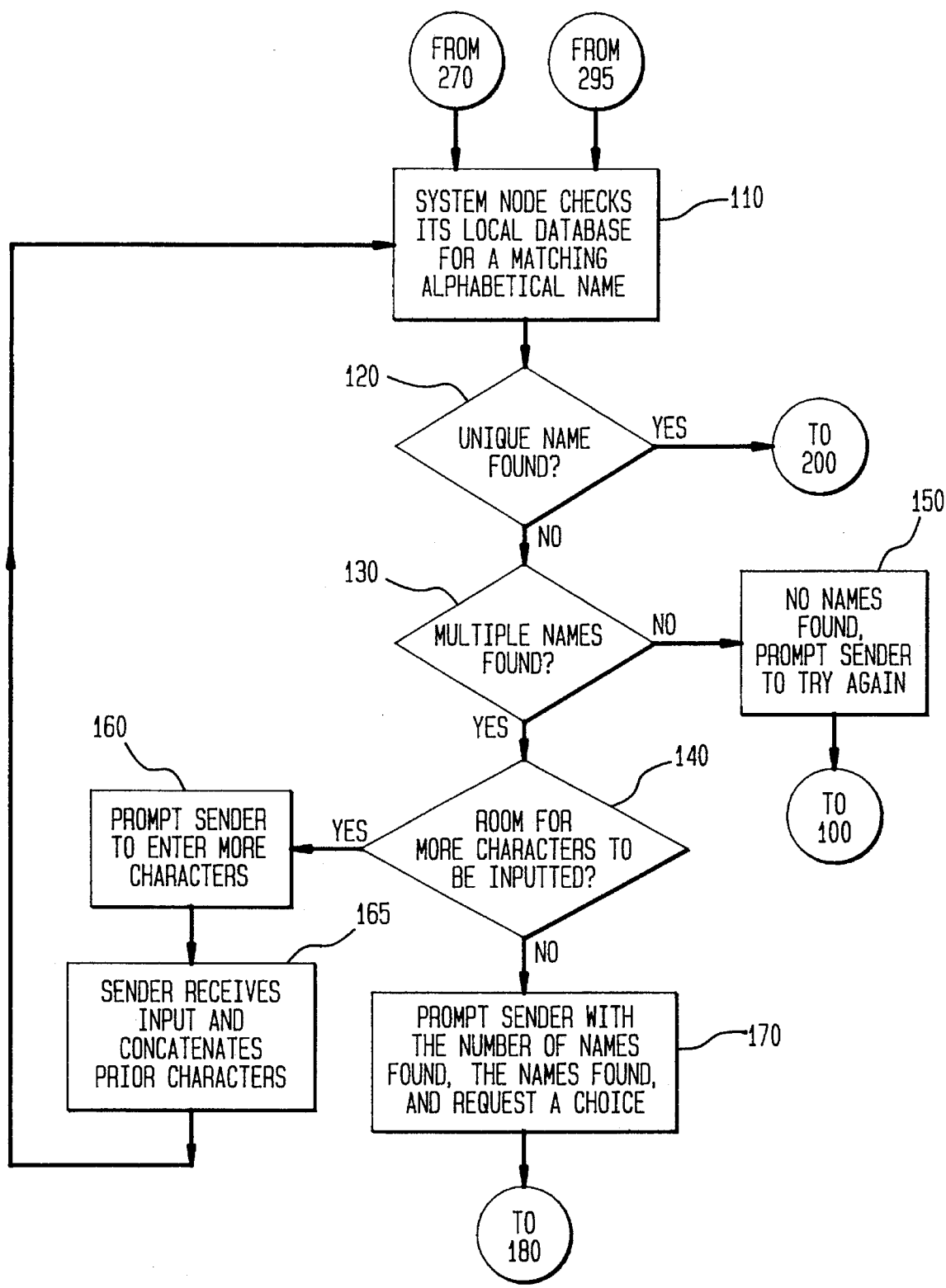
Figure 2D:
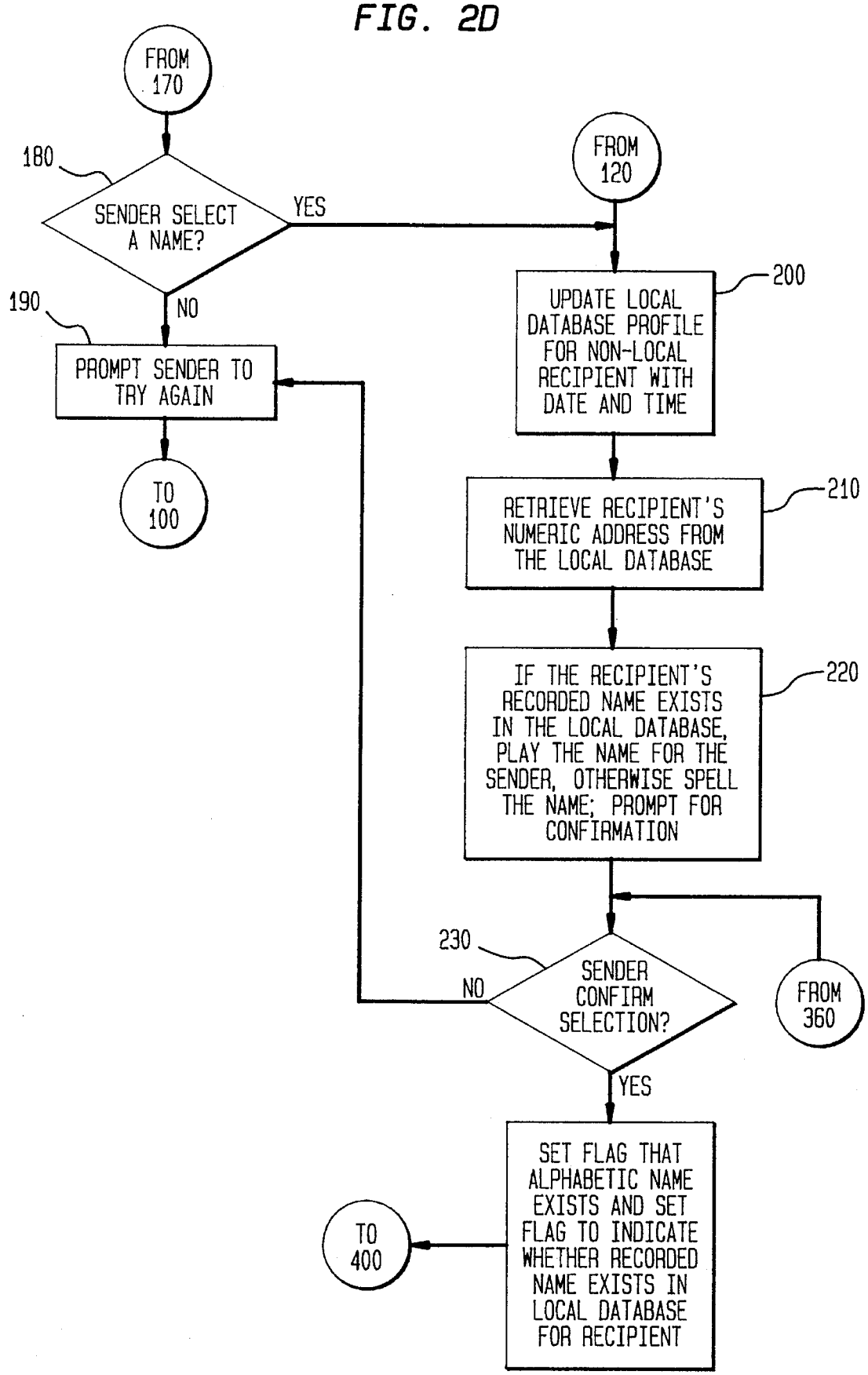

At box 360 of FIG. 2B, the sender's system node prompts the sender for confirmation and control is transferred to box 230 of FIG. 2D.

At box 110 of FIG. 2C, the sender's system node checks its local database for alphabetical names that match the possible names input by the sender. As those of ordinary skill in the art appreciate, there are a number of possible names input by the sender because each numeric key on a typical telephone keypad may correspond to a multiplicity of characters. However, the present invention is not limited to embodiments wherein a numeric key may represent a multiplicity of alphabetic characters. In fact, some embodiments may utilize a telephone set which has the capability of alphabetic input and some other embodiments may provide other methods whereby a key indicates a single alphabetic character. Determining what constitutes a match is also well known to those of ordinary skill in the art. Then, control is transferred to decision box 120 of FIG. 2C.

At decision box 120 of FIG. 2A, the sender's system node determines whether a unique name was found in the local database. If so, control is transferred to box 200 of FIG. 2D, otherwise, control is transferred to decision box 130 of FIG. 2C.

At decision box 130 of FIG. 2C, the sender's system node determines whether multiple names were found. If so, control is transferred to decision box 140 of FIG. 2C, otherwise, control is transferred to box 150 of FIG. 2C.

At decision box 140 of FIG. 2C, the sender's system node determines whether the system will accept more characters or the name entry input has reached a predetermined maximum. If the system will accept more characters, control is transferred to box 160 of FIG. 2C, otherwise, control is transferred to box 170 of FIG. 2C.

At box 150 of FIG. 2C, no names have been found in the local database which match the sender's input. The sender's system node sends a prompt to the user, via voice or via a display on the sender's telephone, if available, for the sender to try again. Then, control is transferred to box 100 of FIG. 2A.

At box 160 of FIG. 2C, the sender's system node prompts the sender to enter more characters and control is transferred to box 165 of FIG. 2C to await the further sender input.

At box 165 of FIG. 2C, the sender's system node receives the new characters and adds them to the end of the previously entered character string. Then, control is transferred to box 110 of FIG. 2C.

At box 170 of FIG. 2C, the sender's system node prompts the sender with the number of names it has found, the names actually found, and a request for the sender to make a choice. Then, control is transferred to decision box 180 of FIG. 2D. As those of ordinary skill in the art readily appreciate, the sender's system node has well known means for detecting sender input time-out and for detecting predetermined key press sequences for ending a particular part of the interactive procedure.

At decision box 180 of FIG. 2D, the sender's system node determines whether the sender has selected a name in the list by, for example, pressing predetermined keys. If so, control is transferred to box 200 of FIG. 2D, otherwise control is transferred to box 190 of FIG. 2D.

At box 190 of FIG. 2D, the sender's system node prompts the sender to try again. Then, control is transferred to box 100 of FIG. 2A.

At box 200 of FIG. 2D, the sender's system node updates its local database for the non-local recipient to add the present date and time to a non-local user profile. Then, control is transferred to box 210 of FIG. 2D.

At box 210 of FIG. 2D, the sender's system node retrieves the recipient's numeric address from the local database of the sender's system node. Then, control is transferred to box 220 of FIG. 2D.

At box 220 of FIG. 2D, the sender's system node plays the recipient's recorded name if the recorded name exists in its local database, otherwise, the sender's system node spells the recipient's name. The sender's system node prompts the sender for confirmation. Then, control is transferred to decision box 230 of FIG. 2D.

At decision box 230 of FIG. 2D, the sender's system node determines whether the sender confirms the selection. If so, control is transferred to box 240 of FIG. 2D, otherwise, control is transferred to box 190 of FIG. 2D.

At box 240 of FIG. 2D, the sender's system node sets a flag to indicate that the alphabetic name of the recipient exists in the local database for the sender and sets a flag to indicate whether or not the recorded name of the recipient exists in the local database for the sender. Then, control is transferred to box 400 of FIG. 2E.

Figure 2E:
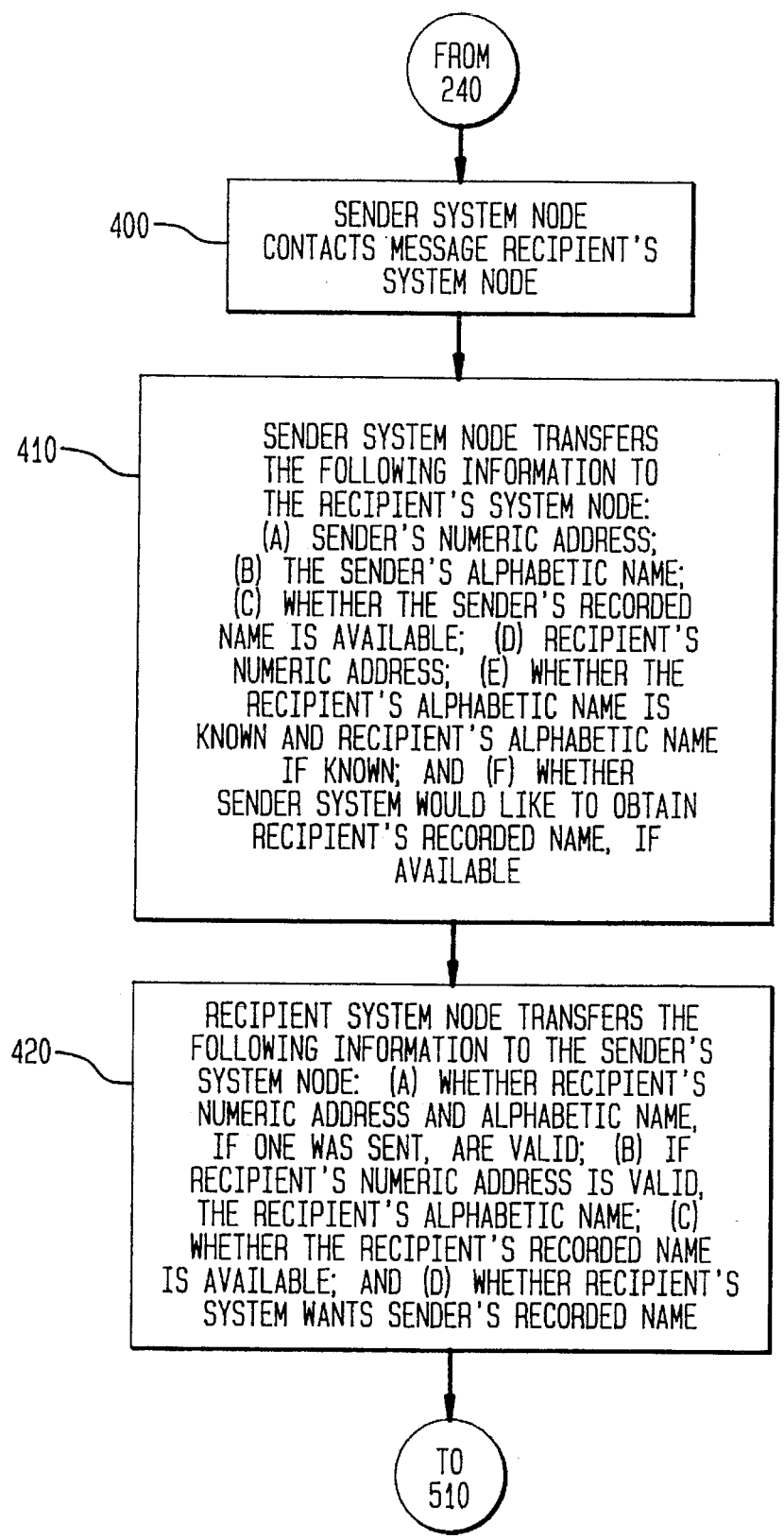

At box 400 of FIG. 2E, the sender's system node contacts the message recipient's system node in a manner which is well known to those of ordinary skill in the art. Then, control is transferred to box 410 of FIG. 2E.

At box 410, the sender's system node transfers the following information to the recipient's system node: (a) sender's numeric address; (b) the sender's alphabetic name;

(c) whether the sender's recorded name is available; (d) the recipient's numeric address; (e) whether the recipient's alphabetic name is known and the recipient's alphabetic name, if known; and (f) whether the sender's system node would like to obtain the recipient's recorded name, if available. Note that: (a) box 410 describes the sender node's side of the sender-recipient communication and (b) the recipient node's side of this transaction is described below in conjunction with box 610 of FIG. 2I. Then, control is transferred to box 420 of FIG. 2E.

At box 420 of FIG. 2E, the recipient's system node transfers the following information to the sender's system node: (a) whether the recipient's numeric address and alphabetic name, if one was sent, are valid; (b) if the recipient's numeric address is valid, the recipient's alphabetic name; (c) whether recipient's recorded name is available; and (d) whether the recipient's system node wants to obtain the sender's recorded name. Note that the transmittal of this information from the recipient's node is described below in conjunction with box 870 of FIG. 2L. Further note, that a numeric address and an alphabetic address are valid if they are the same as the corresponding data which is stored in the local database of the recipient's system node. Then, control is transferred to decision box 510 of FIG. 2G.

Figure 2F:
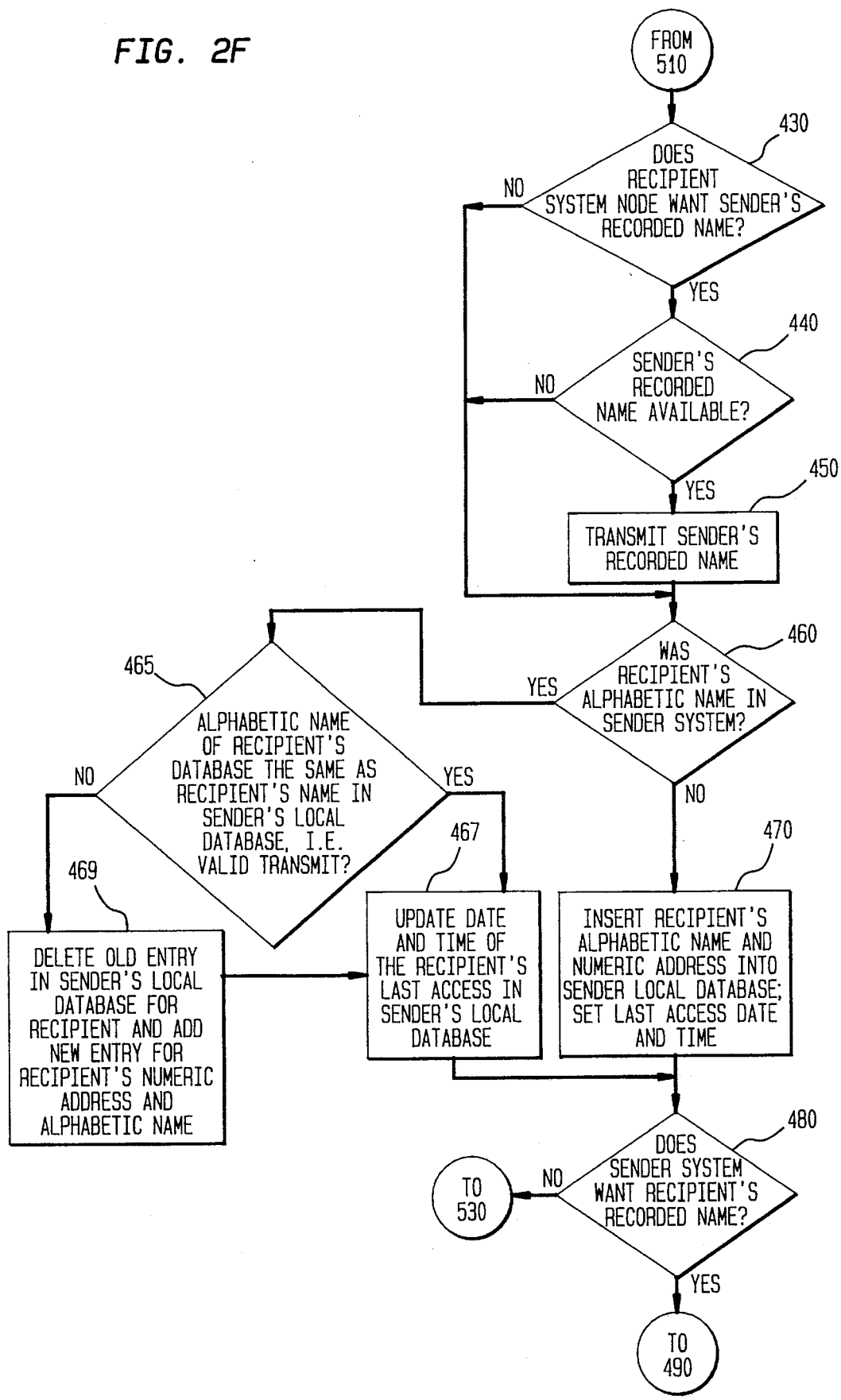
Figure 2G:
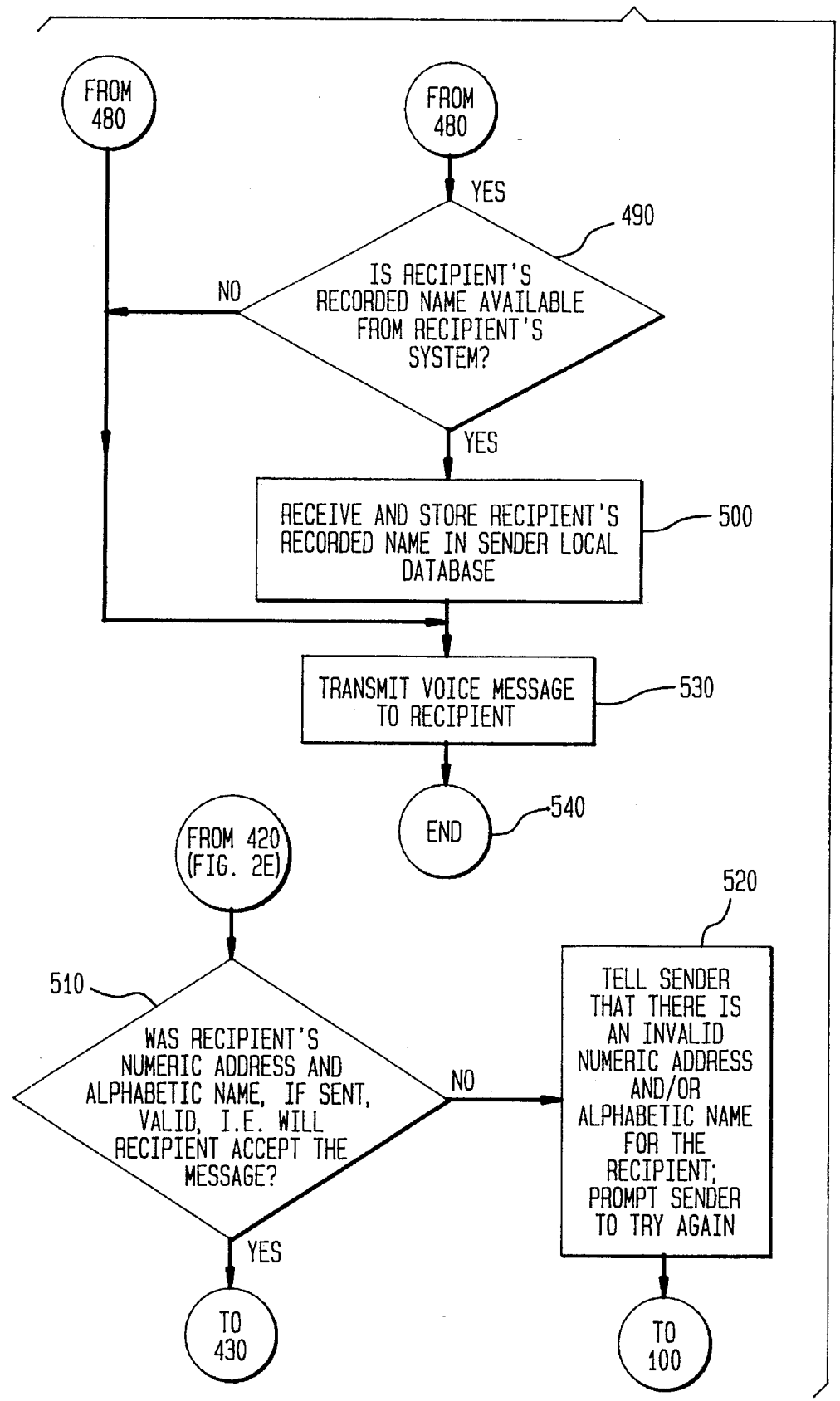

At decision box 510 of FIG. 2G, the sender's system node determines whether the recipient's system node has determined that the recipient's numeric address and alphabetic name, if sent, are valid—if either of them is invalid, the recipient's system node will not accept the message. If they are valid, the recipient's system node will accept the message and control is transferred to box 430 of FIG. 2F, otherwise, control is transferred to box 520 of FIG. 2G.

At box 520 of FIG. 2G, the sender's system node informs the sender, by voice message and/or display, if available, that there is an invalid numeric address and/or alphabetic name for the recipient. Then, the sender's system node sends a prompt to the user, via voice or via a display on the sender's telephone, if available, for the sender to try again. Then, control is transferred to box 100 of FIG. 2A.

At decision box 430 of FIG. 2F, the sender's system node determines whether the recipient's system node wants to obtain the sender's recorded name. If so, control is transferred to decision box 440 of FIG. 2F, otherwise, control is transferred to decision box 460 of FIG. 2F.

At decision box 440 of FIG. 2F, the sender's system node determines whether the sender's recorded name is available. If so, control is transferred to box 450 of FIG. 2F, otherwise, control is transferred to decision box 460 of FIG. 2F.

At box 450 of FIG. 2F, the sender's system node transmits the sender's recorded name to the recipient's system node. Then, control is transferred to decision box 460 of FIG. 2F.

At decision box 460 of FIG. 2F, the sender's system node determines whether the recipient's alphabetic name was in sender's local database. If so, control is transferred to 465 of FIG. 2F, otherwise, control is transferred to box 470 of FIG. 2F.

At decision box 465 of FIG. 2F, the sender's system node determines whether the alphabetic name of the recipient which is received from the local database of the recipient's system node is the same as the recipient's alphabetic name that is already stored in the local database of the sender's system node, i.e., did the recipient's system node determine that the recipient's numeric address and alphabetic name are valid. If so, control is transferred to box 467 of FIG. 2F, otherwise, control is transferred to box 469 of FIG. 2F.

At box 467 of FIG. 2F, the sender's system node sets or updates the date and time for the last access to the recipient in its local database. Then, control is transferred to decision box 480 of FIG. 2F.

At box 469 of FIG. 2F, the sender's system node deletes the old entry for the recipient in its local database and adds a new entry with recipient's numeric address and alphabetic name. Then, control is transferred to box 467 of FIG. 2F.

At box 470 of FIG. 2F, the sender's system node inserts the recipient's alphabetic name and numeric address into the sender's local database and sets the last access date and time. Then, control is transferred to decision box 480 of FIG. 2F.

At decision box 480 of FIG. 2F, the sender's system node determines whether it wants to receive the recipient's recorded name. If so, control is transferred to decision box 490 of FIG. 2G, otherwise, control is transferred to box 530 of FIG. 2G.

At decision box 490 of FIG. 2G, the sender's system node determines whether the recipient's recorded name is available from the recipient's system node. If so, control is transferred to box 500 of FIG. 2G, otherwise, control is transferred to decision box 530 of FIG. 2G.

At box 500 of FIG. 2G, the sender's system node receives the recipient's recorded name from the recipient's system node and stores it in the sender's local database. Then, control is transferred to decision box 530 of FIG. 2G.

At box 530 of FIG. 2G, the sender's system node transmits the voice message to the recipient's system node. Then, control is transferred to box 540 of FIG. 2G.

At box 540 of FIG. 2G, the sender's system node finishes the interaction with the sender in a manner which is well known to those of ordinary skill in the art to disconnect or to offer the sender the option of continuing the interaction to perform further services.

We now describe the operation of the recipient's system node in conjunction with FIGS. 2I–2N.

At box 600 of FIG. 2I, the recipient's system node accepts a call from the sender's system node. Then, control is transferred to box 610.

At box 610 of FIG. 2I, the recipient's system node receives the following information from the sender's system node: (a) the sender's numeric address; (b) the sender's alphabetic name; (c) whether the sender's recorded name is available; (d) the recipient's numeric address; (e) whether the recipient's alphabetic name is known to the sender's system node and the recipient's alphabetic name, if known; and (f) whether sender's system node would like to obtain the recipient's recorded name, if available. Note that this information is sent to the recipient's system node from box 410 of FIG. 2E which was described above. Then, control is transferred to decision box 620 of FIG. 2I.

At box 620 of FIG. 2I, the recipient's system node checks its local database to determine whether the recipient's numeric address transmitted from the sender's system node is one which is contained in the recipient's local database. If so, control is transferred to box 650 of FIG. 2I, otherwise, control is transferred to box 640 of FIG. 2I.

At box 640 of FIG. 2I, the recipient's system node sets a flag that indicates that the recipient's numeric address is invalid. Then, control is transferred to box 710 of FIG. 2J.

At box 650 of FIG. 2I, the recipient's system node sets a flag that indicates that the recipient's numeric address is valid. Then, control is transferred to box 660 of FIG. 2I.

At box 660 of FIG. 2I, the recipient's system node checks its local database to retrieve the recipient's alphabetic name. Then, control is transferred to decision box 665 of FIG. 2N.

Figure 2J:
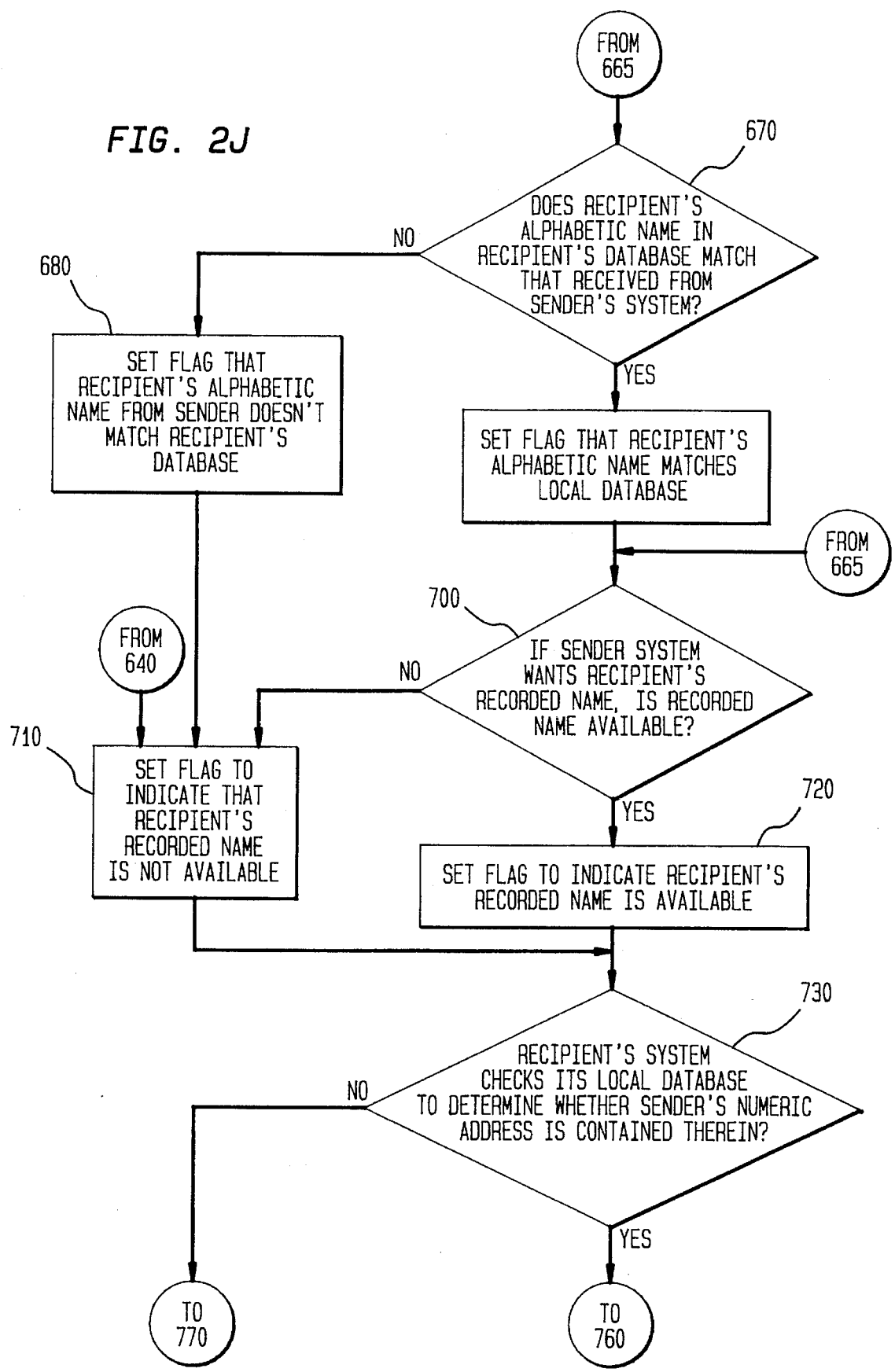
Figure 2K:
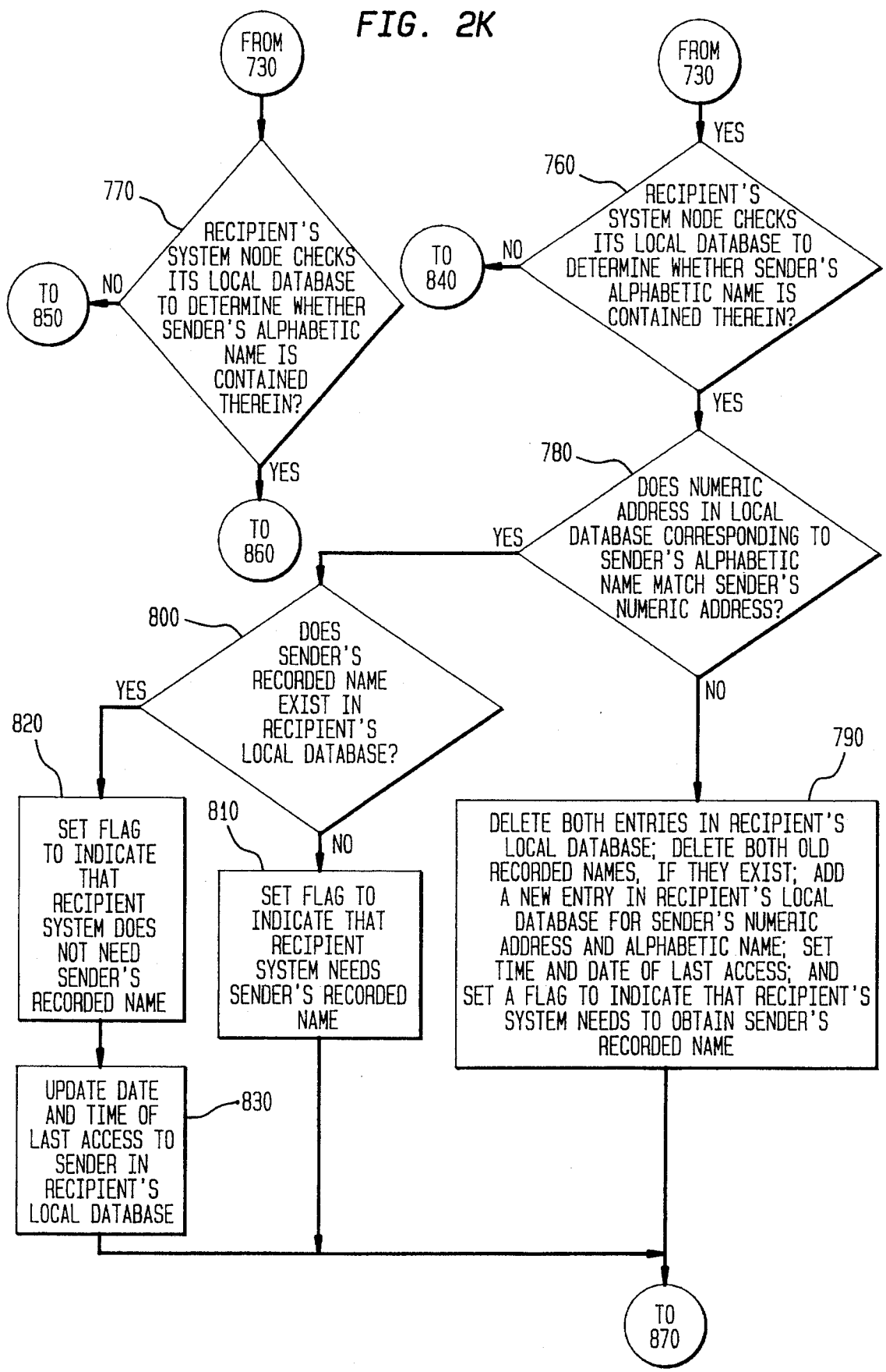
Figure 2L:
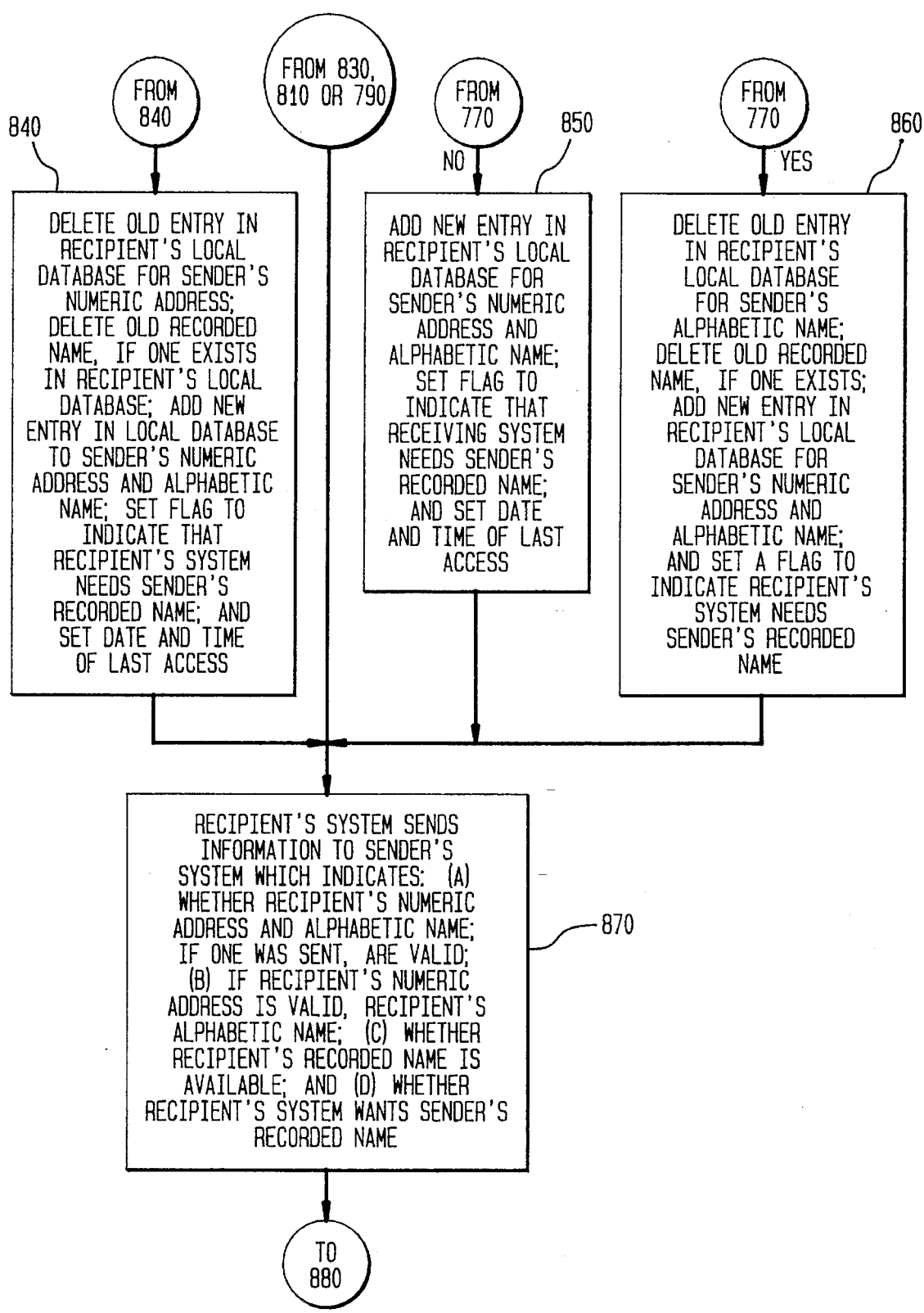
Figure 2M:
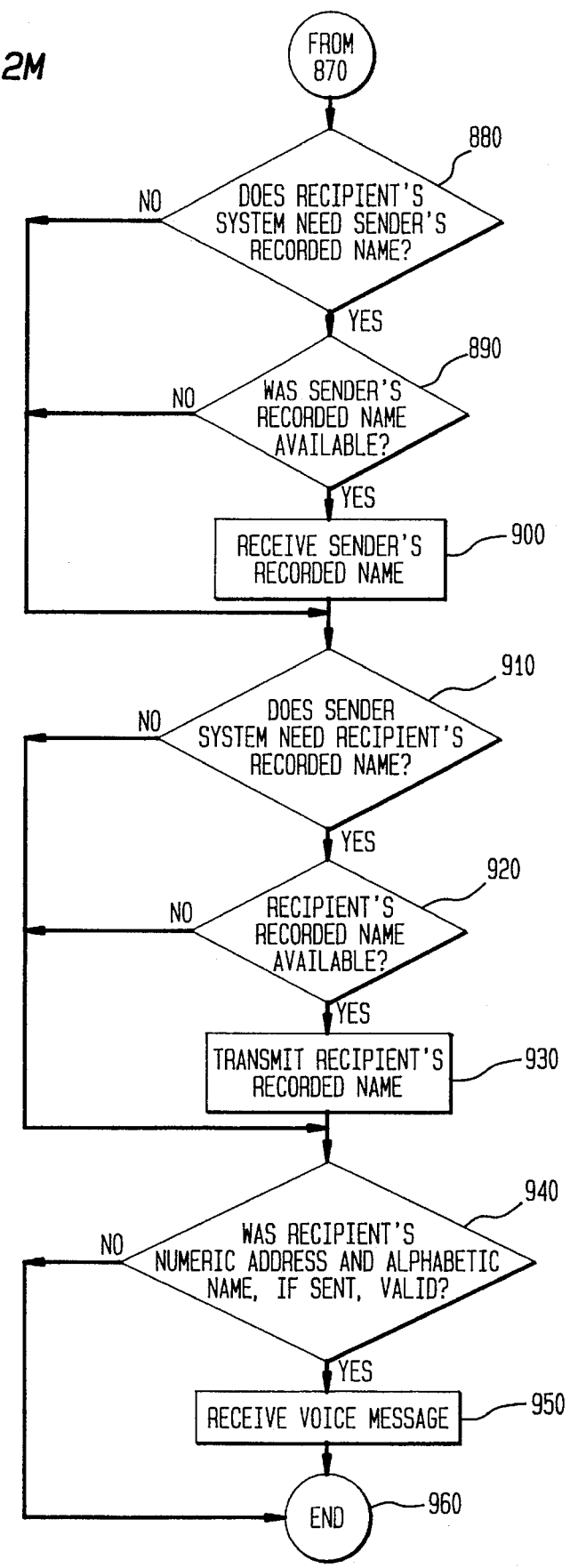
Figure 2N:
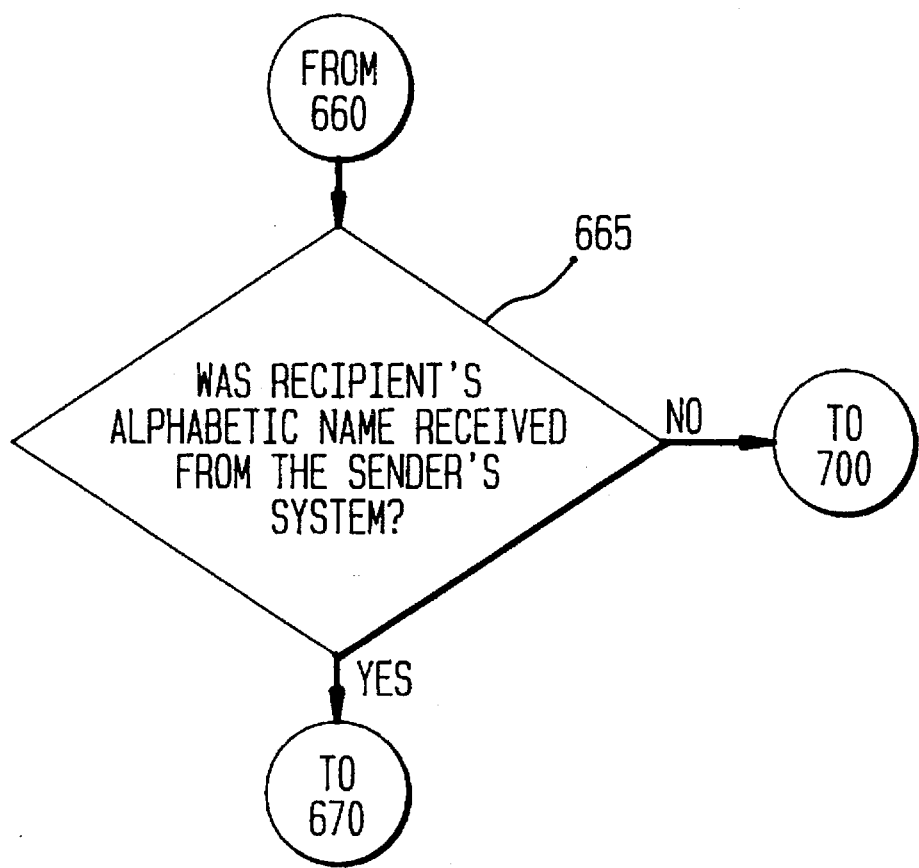

At decision box 665 of FIG. 2N, the recipient's system node determines whether the alphabetic name of the recipient was received from the sender's system node. If so, control is transferred to decision box 670 of FIG. 2J, otherwise, control is transferred to decision box 700 of FIG. 2J.

At decision box 670 of FIG. 2J, the recipient's system node determines whether the recipient's alphabetic name in its local database matches that received from the sender's system node. If so, control is transferred to box 690 of FIG. 2J, otherwise, control is transferred to box 680 of FIG. 2J.

At box 680 of FIG. 2J, the recipient's system node sets a flag to indicate that the recipient's alphabetic name which was sent by the sender's system node does not match the recipient's name in the recipient's local database. Then, control is transferred to box 710 of FIG. 2J.

At box 690 of FIG. 2J, the recipient's system node sets a flag to indicate that the recipient's alphabetic name which was sent by the sender's system node matches the recipient's name in the recipient's local database. Then, control is transferred to decision box 700 of FIG. 2J.

At decision box 700 of FIG. 2J, the recipient's system node determines whether the sender's system node wants to receive the recipient's recorded name and, if so, the recipient's system node determines whether the recipient's recorded name is available in its local database. If so, control is transferred to box 720 of FIG. 2J, otherwise, control is transferred to box 710 of FIG. 2J.

At box 710 of FIG. 2J, the recipient's system node sets a flag to indicate that the recipient's recorded name is not available in its local database. Then, control is transferred to box 730 of FIG. 2J.

At box 720 of FIG. 2J, the recipient's system node sets a flag to indicate that the recipient's recorded name is available in its local database. Then, control is transferred to box 730 of FIG. 2J.

At box 730 of FIG. 2J, the recipient's system node checks its local database to determine whether the sender's numeric address is contained therein. If so, control is transferred to 760, otherwise, control is transferred to box 770 of FIG. 2K.

At decision box 760 of FIG. 2K, the recipient's system node checks its local database to determine whether the sender's alphabetic name is contained therein. If so, control is transferred to decision box 780 of FIG. 2K, otherwise, control is transferred to box 840 of FIG. 2L.

At decision box 770 of FIG. 2K, the recipient's system node checks its local database to determine whether the sender's alphabetic name is contained therein. If so, control is transferred to box 860 of FIG. 2L, otherwise, control is transferred to box 850 of FIG. 2L.

At decision box 780 of FIG. 2K, the recipient's system node determines whether the numeric address in its local database corresponding to the sender's alphabetic name matches the sender's numeric address transmitted by the sender's system node. If so, control is transferred to decision box 800 of FIG. 2K, otherwise, control is transferred to box 790 of FIG. 2K.

At box 790 of FIG. 2K, the recipient's system node deletes both entries in its local database; deletes both recorded names, if they exist; adds a new entry in its local database for the sender's numeric address and alphabetic name; sets the time and date of the last access; and sets a flag to indicate that the recipient's system node needs to obtain the sender's recorded name. Then, control is transferred to box 870 of FIG. 2L.

At decision box 800 of FIG. 2K, the recipient's system node determines whether the sender's recorded name exists in its local database. If so, control is transferred to box 820 of FIG. 2K, otherwise, control is transferred to box 810 of FIG. 2K.

At box 810 of FIG. 2K, the recipient's system node sets a flag to indicate that the recipient's system node needs to obtain the sender's recorded name. Then, control is transferred to box 870 of FIG. 2L.

At box 820 of FIG. 2K, the recipient's system node sets a flag to indicate that the recipient's system node does not need to obtain the sender's recorded name. Then, control is transferred to box 830 of FIG. 2K.

At box 830 of FIG. 2K, the recipient's system node updates the date and time of the last access to sender in recipient's local database. Then, control is transferred to box 870 of FIG. 2L.

At box 840 of FIG. 2L, the recipient's system node deletes the old entry in its local database for the sender's numeric address, deletes the old recorded name in its local database, if one exists, adds a new entry in its local database for the sender's numeric address and alphabetic name, sets a flag to indicate that the recipient's system node needs to obtain the sender's recorded name, and sets the date and time of the last access. Then, control is transferred to box 870 of FIG. 2L.

At box 850 of FIG. 2L, the recipient's system node adds a new entry in its local database for the sender's numeric address and alphabetic name, sets a flag to indicate that the recipient's system node needs to obtain the sender's recorded name, and sets the date and time of the last access. Then, control is transferred to box 870 of FIG. 2L.

At box 860 of FIG. 2L, the recipient's system node: deletes old entry in its local database for the sender's alphabetic name; deletes the old sender's recorded name, if one exists; adds a new entry in its local database for the senders numeric address and alphabetic name; and sets a flag to indicate that the recipient's system node needs to obtain the sender's recorded name. Then, control is transferred to box 870 of FIG. 2L.

At box 870 of FIG. 2L, the recipient's system node sends the following information to the sender's system node: (a) whether recipient's numeric address and the recipient's alphabetic name, if one was sent, are valid; (b) if the recipient's numeric address is valid, recipient's alphabetic name; (c) whether the recipient's recorded name is available; and (d) whether the recipient's system node wants to obtain the sender's recorded name. Note that this information is received by the sender's system node at box 420 of FIG. 2E which was described above. Then, control is transferred to decision box 880 of FIG. 2M.

At decision box 880 of FIG. 2M, the recipient's system node determines whether it needs to obtain the sender's recorded name. If so, control is transferred to decision box 890 of FIG. 2M, otherwise, control is transferred to decision box 910 of FIG. 2M.

At decision box 890 of FIG. 2M, the recipient's system node determines whether the sender's recorded name is available from the sender's system node. If so, control is transferred to box 900, otherwise, control is transferred to decision box 910 of FIG. 2M.

At box 900 of FIG. 2M, the recipient's system node receives the sender's recorded name from the sender's system node. Then, control is transferred to decision box 910.

At decision box 910 of FIG. 2M, the recipient's system node determines whether the sender's system node wants to obtain the recipient's recorded name. If so, control is transferred to decision box 920 of FIG. 2M, otherwise, control is transferred to decision box 940 of FIG. 2M.

At decision box 920 of FIG. 2M, the recipient's system node determines whether the recipient's recorded name is available in its local database. If so, control is transferred to box 930 of FIG. 2M, otherwise, control is transferred to decision box 940 of FIG. 2M.

At box 930 of FIG. 2M, the recipient's system node transmits the recipient's recorded name to the sender's system node. Then, control is transferred to decision box 940 of FIG. 2M.

At decision box 940 of FIG. 2M, the recipient's system node determines whether the recipient's numeric address and alphabetic name, if sent, are valid. If so, control is transferred to box 950 of FIG. 2M, otherwise, control is transferred to box 960 of FIG. 2M.

At box 950 of FIG. 2M, the recipient's system node receives the voice message from the sender's system node and saves it in its local database for use in a manner which is well known to those of ordinary skill in the art. Then, control is transferred to box 960 of FIG. 2M.

At box 960 of FIG. 2M, the recipient's system node terminates its interaction with the sender's system node.

Further, those skilled in the art recognize that further embodiments of the present invention may be made without departing from its teachings. For example, embodiments of the present invention may include spoken messages along with spoken names and the non-local database profiles may keep track of other statistics such as, for example, amount of use and time spent on an interaction and so forth. In addition, certain embodiments of the present invention include utility programs for displaying specific non-local records for evidence of activity and for deleting records which do not have a predetermined amount of activity.

What is claimed is:

1. A computer implemented method for generating a database of identifiers of message senders and message recipients for store-and-forward message system nodes in a network of store-and-forward message system nodes, each said message sender and each said message recipient having at least one separate and distinct identifier, the method comprising the steps of:

a message sender's system node storing a first identifier for a message recipient in a database associated with the message sender's system node;

the message sender's system node determining whether the database associated with the message sender's system node contains a second identifier for the message recipient;

if not, the message sender's system node identifying the message recipient's system node from said first identifier and requesting the message recipient's system node to send the message recipient's second identifier to the message sender's system node; and the message sender's system node storing the message recipient's second identifier in its associated database.

2. The method of claim 1 which further comprises the steps of:

the message sender's system node sending a second identifier for the message sender to the message recipient's system node;

the message recipient's system node determining whether a database associated with the message recipient's system node contains the message sender's second identifier; and if not, the message recipient's system node storing the message sender's second identifier in its associated database.

3. The method of claim 2 which further comprises the steps of:

the message sender's system node storing activity log information for predetermined message recipients whose second identifiers are stored in its associated database; and the message recipient's system node storing activity log information for predetermined message senders stored in its associated database.

4. The method of claim 2 which further comprises the steps of:

a message sender's system node determining whether a database associated with the message sender's system node contains a message recipient's recorded speech identifier;

if not, the message sender's system node requesting the message recipient's system node to send the message recipient's recorded speech identifier to the message sender's system node; and the message sender's system node storing the message recipient's recorded speech identifier in its associated database.

5. The method of claim 4 which further comprises the steps of:

the message recipient's system node determining whether a database associated with the message recipients system node contains the message sender's recorded speech identifier;

if not, the message recipient's system node requesting the message sender's system node to send the message sender's recorded speech identifier to the message recipient's system node; and the message recipient's system node storing the message sender's recorded speech identifier in its associated database.

6. The method of claim 3 which further comprises the steps of:

accessing a database associated with a system node and examining the activity log which is associated with predetermined message senders and predetermined message recipients at predetermined times; and deleting message senders and message recipients whose activity log information fails to satisfy predetermined criteria.

7. The method of claim 1 in which the second identifier is the recipient's name.

8. The method of claim 1 in which the second identifier is an identifying number associated with the recipient.

9. The method of claim 1 in which said second identifier is the message recipient's recorded speech identifier.

10. A method as in claim 1, wherein the method of identifying the message recipient's system node is to store the message recipient's system node as the message recipient's second identifier.

* * * * *